United States Patent [19]
Bechamps et al.

[11] Patent Number: 5,978,540
[45] Date of Patent: Nov. 2, 1999

[54] APPARATUS FOR INTERCONNECTING OPTICAL FIBERS

[75] Inventors: Ronald D. Bechamps, Robbinsville; William S. Leib, III, Tinton Falls; James S. Fasano, Rutherford, all of N.J.

[73] Assignee: Antec Corporation, Duluth, Ga.

[21] Appl. No.: 09/065,809

[22] Filed: Apr. 23, 1998

[51] Int. Cl.[6] .................................................. G02B 6/00
[52] U.S. Cl. ......................... 385/134; 385/147; 385/135
[58] Field of Search ...................................... 385/130–138

[56] References Cited

U.S. PATENT DOCUMENTS

| | | | |
|---|---|---|---|
| 4,082,390 | 4/1978 | Gibson et al. | 312/284 |
| 4,189,196 | 2/1980 | Baker et al. | 312/236 |
| 5,394,503 | 2/1995 | Dietz, Jr. et al. | 385/135 |
| 5,628,241 | 5/1997 | Chavanaz et al. | 99/331 |
| 5,771,354 | 6/1998 | Crawford | 709/229 |
| 5,901,228 | 5/1999 | Crawford | 380/25 |

*Primary Examiner*—Akm E. Ullah
*Attorney, Agent, or Firm*—William A. Hartselle

[57] ABSTRACT

A cabinet for interconnecting and storing optical fibers. The cabinet includes a plurality of left side members and right side members, each of which extends generally horizontally. A plurality of trays are slidably situated in the cabinet between the respective left and right side members. Each tray includes a generally flat base and open sides. The open sides permit optical fibers to be introduced into the tray from any position along the side of the tray. A gap is defined between each side member and the side members immediately above and below it. Each gap extends between the entire length of each side member from the front of the cabinet to the back. The gap provides adequate clearance for fibers introduced into the trays to move along the length of the gap when the tray is slid in and out of the cabinet. The gaps between side members allow for optical fibers to be introduced into the tray by service personnel from the front of the cabinet without having to access the rear of the cabinet to feed optical fibers into the trays through openings in the back of the cabinet.

17 Claims, 3 Drawing Sheets

APPARATUS FOR INTERCONNECTING OPTICAL FIBERS

TECHNICAL FIELD

The present invention relates generally to the storage and interconnection of optical fibers and more particularly to a cabinet with slidable trays for storing and interconnecting optical fibers.

BACKGROUND OF THE INVENTION

The use of fiber optic cable as a transmission medium is common in communications systems. A fiber optic cable is typically a single cable within which is provided a plurality of individual optical fibers. Each optical fiber within the cable may be used to transmit information such as voice or data via light signals.

Fiber optic communications systems typically include many interconnections in which one optical fiber is connected to another optical fiber. Optical fibers may have a connector on one or both ends of the fiber. The connector on one optical fiber can be mated with a similar connector attached to the end of another optical fiber via an adapter. In this manner, multiple optical fibers can be interconnected.

Optical fibers are typically stored and interconnected in a cabinet-type apparatus. These cabinets may include a plurality of trays in which lengths of different fibers are stored and interconnected to other fibers. Typically, the cabinet includes a frame having a plurality of trays on which the interconnection and storage of excess fiber occurs. Each tray may include a bulkhead to which the connectors from different optical fibers may be attached to establish the interconnection of fibers. The bulkhead on the tray is typically accessible only when the tray is slid outwardly from the cabinet. Each tray is typically slidably mounted within the cabinet to allow service personnel to pull each tray outwardly to access its contents from the front of the cabinet.

One of the problems with existing cabinets is the arrangement of the many fibers going into and coming from the plurality of trays in the cabinet. It is imperative that the many fibers remain organized and free from entanglement with other fibers. The problem of disorganization and entanglement of fibers is exacerbated by the trays being slid in and out of the cabinet. Many cabinets require the optical fibers to be inserted into the trays through openings in the rear of the cabinet. In this manner, when the trays are slid in and out of the cabinet, the fibers slide out of and into the cabinet through the rear of the cabinet and are less apt to get tangled with other fibers.

However, this is disadvantageous because it is less convenient to feed fibers into the trays from the rear of the cabinet where access to the trays is limited. Feeding fibers into the cabinet from the rear requires that adequate space be provided behind the cabinet to allow service personnel to access the rear of the cabinet. It would be advantageous to be able to introduce the fibers into each tray from the front of the cabinet. However, if the fibers are fed into the tray from the front and interconnected to a tray when the tray has been slid out of the cabinet, the fibers may become tangled when the tray is slid back into the cabinet. Therefore, when the only opening for the fibers to enter the cabinet is in the front of the cabinet, the fibers become crammed into the cabinet when the tray is slid inwardly.

Therefore, a need exists for a cabinet for interconnecting optical fibers in which the optical fibers can be fed into a tray and interconnected from the front of the cabinet, and where the fibers do not become tangled or disorganized when the tray is slid into and out of the cabinet.

SUMMARY OF THE INVENTION

The present invention includes a cabinet for interconnecting optical fibers. The cabinet includes a plurality of horizontal left side members and right side members. A plurality of trays are slidably situated in the cabinet between respective left and right side members. Each tray includes a generally flat base and open sides, which permits optical fibers to be introduced into the tray from any position along the side of the tray, rather than through a specific entrance to the tray.

A gap is defined between each side member and the side members immediately above and below it and extends the entire length of each side member. The gap between each side member provides adequate clearance for fibers introduced into the trays to move through the gap when the tray is slid in and out of the cabinet. The gaps therefore allow the fibers to travel freely when the tray is slid in and out of the cabinet, unimpeded by other structural elements of the cabinet. The gaps between side members therefore minimize the entanglement and disorganization of the fibers when the trays are slid in and out of the cabinet. The gaps between side members also allow for optical fibers to be introduced into the tray by service personnel from the front of the cabinet without having to access the rear of the cabinet to feed optical fibers into the trays through openings in the back of the cabinet.

Each tray also includes a bulkhead having a plurality of connection ports therein. The bulkhead is preferably oriented perpendicular to the front of the tray and extends from the front toward the back of the tray. The connectors on the ends of fibers that are introduced into the tray are connected to each other at the connection ports on the bulkhead.

DETAILED DESCRIPTION

Figure 1:
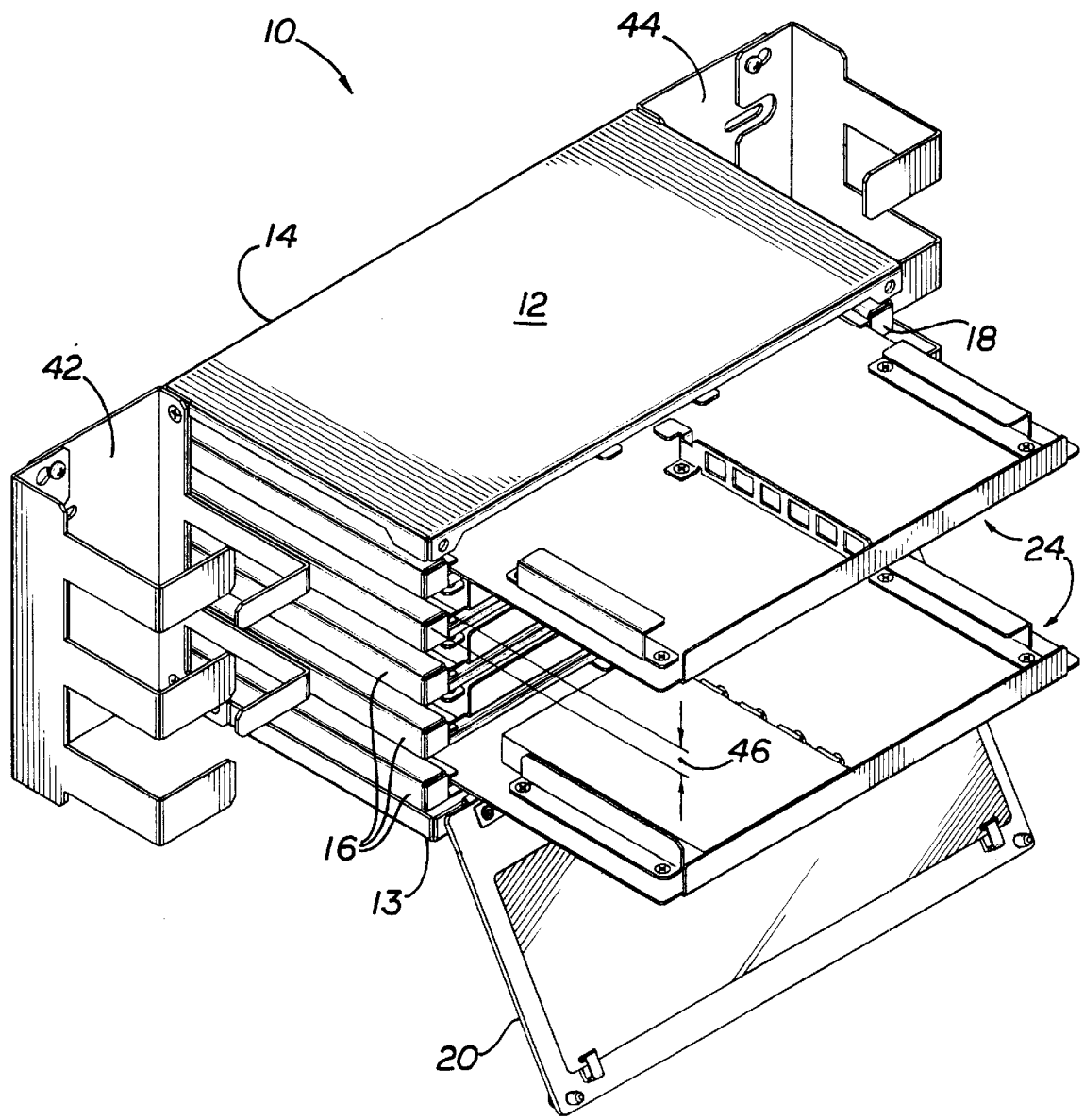
FIG. 1 is a perspective view of a cabinet constructed in accordance with the present invention.
Figure 2A:
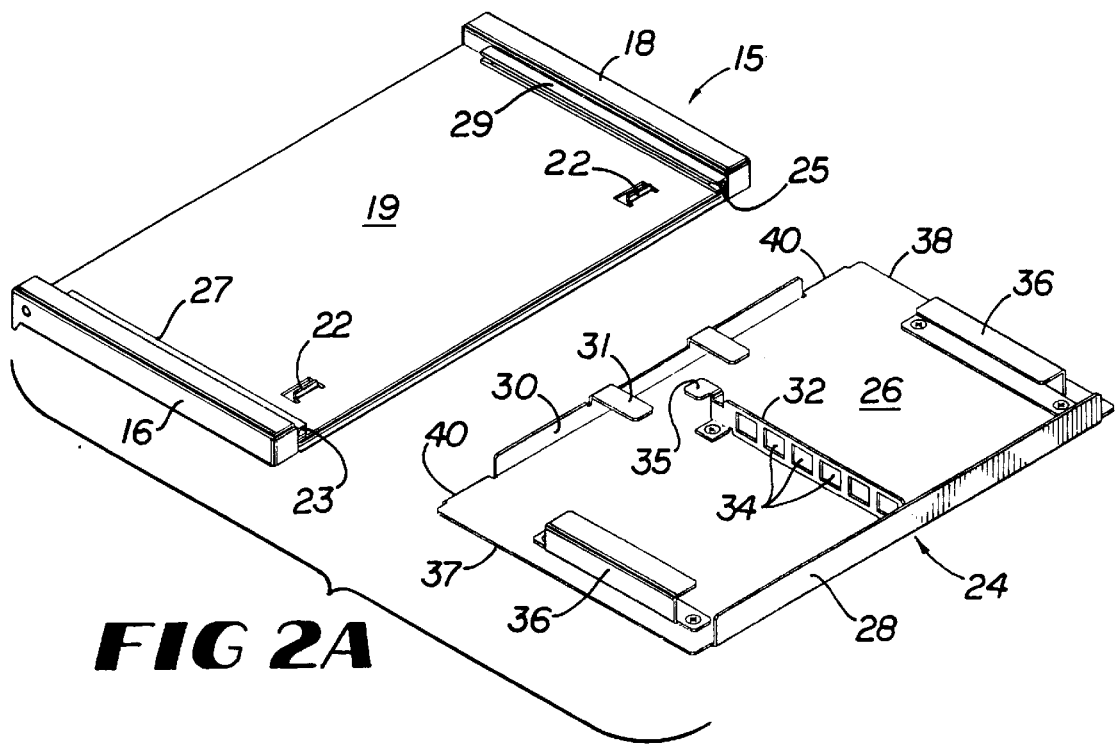
FIGS. 2A and 2B are front and rear perspective views, respectively, showing a tray mount having left and right side members and a tray which can be slidably situated in the tray mount.

The preferred embodiment of the present invention for storing and interconnecting optical fibers is shown in the attached figures and described herein. As best shown in FIGS. 1 and 2A, the present invention includes a cabinet 10 having a top 12, a bottom 13, a back 14, and a plurality of tray mounts 15 extending from the back 14 of the cabinet. Each tray mount 15 includes a left side member 16 and a right side member 18, and a bottom plate 19 which extends generally horizontally between each left and right side member primarily for maintaining the stability of the left and right side members. Each side member is preferably of uniform cross-section throughout the length of the side member, with the cross-section being generally square. However, each side member may also have any other suitable cross-section.

Stop tabs 22 extend upwardly from the bottom plate 19. A generally u-shaped member 27 defining a slot 23 extends along the left side member 16, with the open end of the member extending toward the inside of the cabinet. A similar u-shaped member 29 defining slot 25 extends along the right side member 18 with the open end also extending toward the inside of the cabinet.

A plurality of trays 24 are slidably situated in the cabinet, as shown in FIGS. 1 and 2A. Each tray includes a generally flat base 26, a front lip 28, and a rear lip 30. Tabs 31 extend toward the front of the tray from rear lip 30. Tabs 31 help to keep any excess fiber stored in the back of the tray within the tray. Each tray also includes a bulkhead 32 having a plurality of connection ports 34 therein and a tab 35. The bulkhead is preferably oriented perpendicular to the front lip of the tray and extends from the front lip toward the back of the tray. It will be understood by those skilled in the art that the interconnection of fibers may include the connection of a "pigtail" having a connector on one end of a fiber, and/or the connection of a "jumper" having connectors on both ends of a fiber. The connectors on the ends of the pigtails and jumpers are preferably connected to each other at the connection ports 34 on the bulkhead 32.

Each tray has open sides without sidewalls, the open sides being defined by left edge 37 and right edge 38. The open sides permits fibers to be introduced into the tray from any position along the side of the tray, rather than through a specific entrance to the tray. Alternatively, each tray could include a defined entrance or entrances on each side of the tray instead of the open side configuration.

Figure 2B:
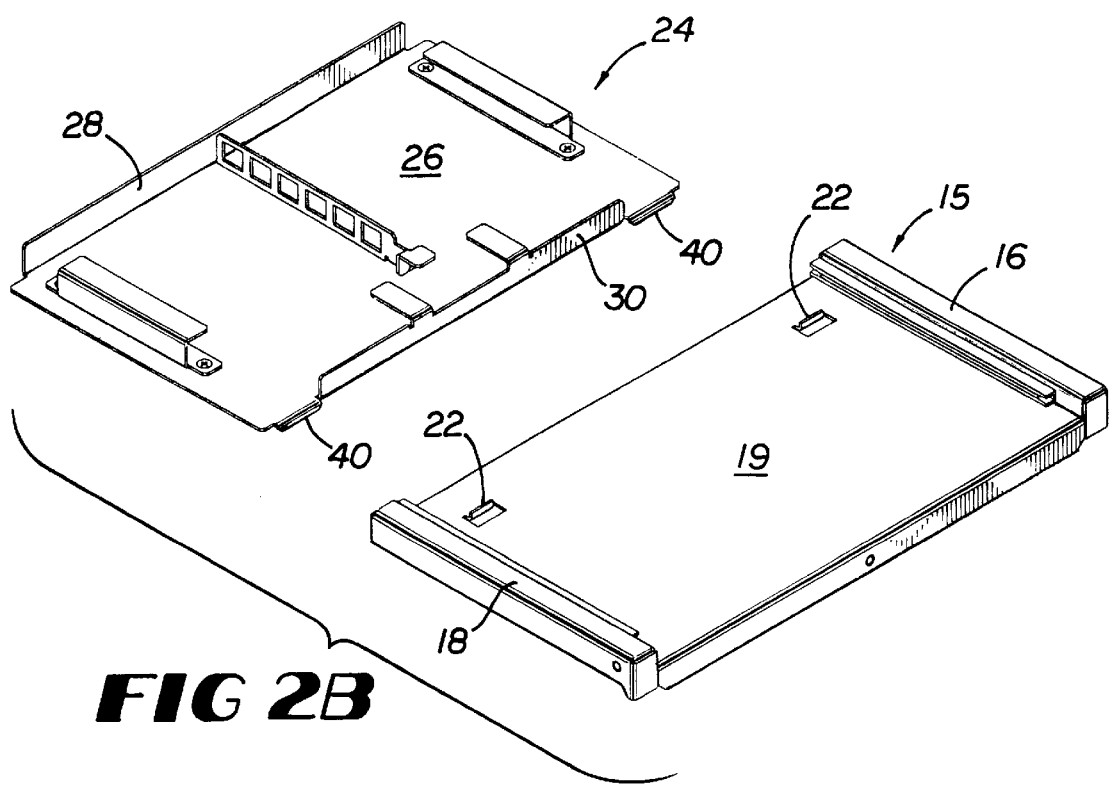

Each tray may also include routing brackets 36 near the left edge and right edge of each tray. Tray stops 40, best seen in FIG. 2B, extend downwardly from the back of the tray at locations corresponding to the locations of stop tabs 22 extending from the bottom plate 19 of the tray mount.

Each tray is slidably situated within the cabinet. The left edge 37 of the tray is slidably situated within slot 23 extending from left side member 16 and the right edge 38 of the tray is slidably situated within slot 25 extending from right side member 18. Each slot 23 and 25 is defined by a generally u-shaped member with its open end extending toward the interior of the cabinet from each left and right side member. The front lip 28 of the tray does not extend across the entire width of the tray, thus leaving a small amount of space for service personnel to insert a finger to grasp the lip to aid in sliding the tray out of the cabinet. Thus, the tray can be slid toward the rear of the cabinet into a storage position generally inside the cabinet and can be slid outward from the front of the cabinet into an access position generally outside the cabinet. When the tray is slid out of the cabinet, the outward movement of the tray terminates when tray stops 40 contact stop tabs 22 extending from the bottom 19 of the tray mount.

Left routing channel 42 and right routing channel 44 are connected to the left and right sides of the cabinet, respectively, preferably at the back 14 of the cabinet. A cabinet door 20 is hingedly connected to the front of the cabinet to cover the trays when they are in the storage position.

Figure 3:
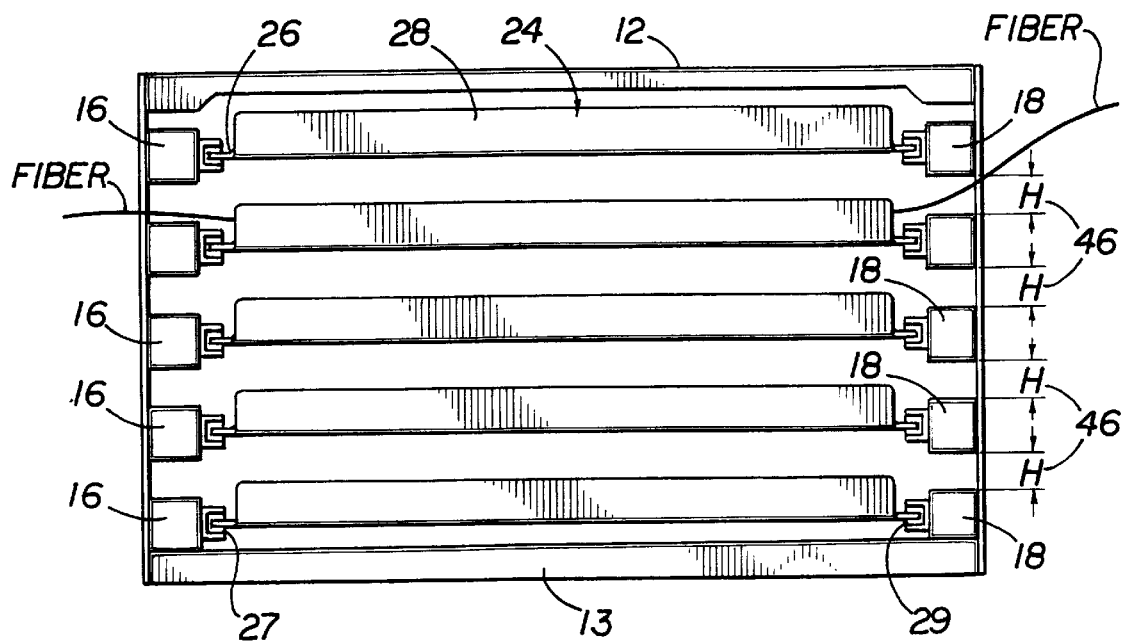
FIG. 3 is a front view of the cabinet showing the gap between adjacent side members.
Figure 4:
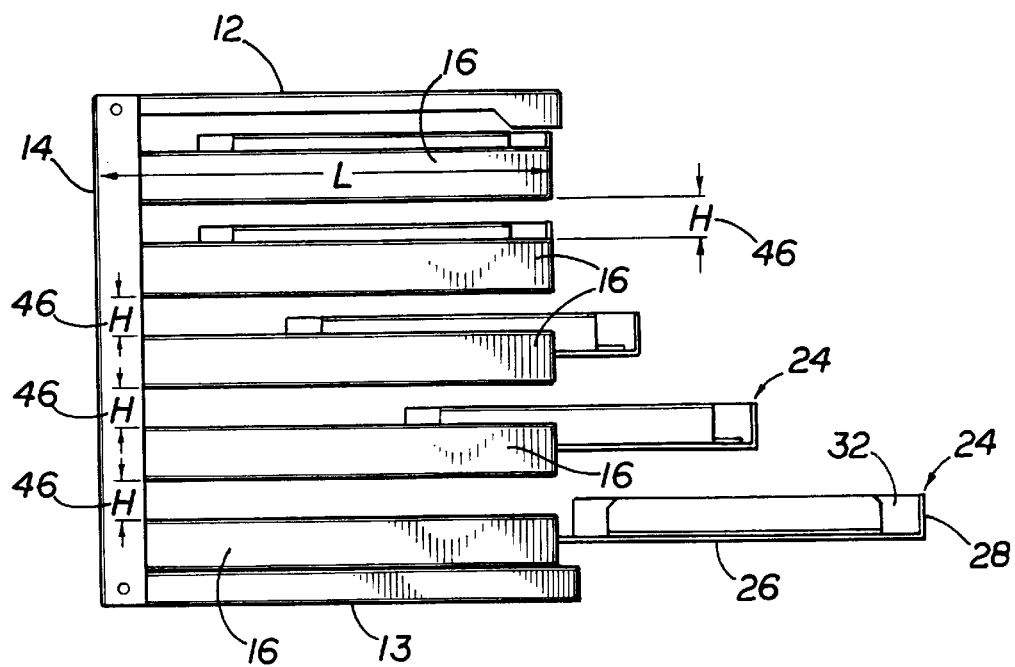
FIG. 4 is a left side view of the cabinet showing the gap between adjacent side members.

As seen in FIGS. 1, 3, and 4, a gap 46 having a height H is defined between each side member 16 and 18 and the side members immediately above and below it. Each gap extends between the entire length L of each side member from the front of the cabinet to the back. The gap between each side member provides adequate clearance for fibers introduced into the trays to move along the length of the gap when the tray is slid in and out of the cabinet. The gaps therefore allow the fibers to travel freely when the tray is slid in and out of the cabinet, unimpeded by other structural elements of the cabinet. The gaps between side members therefore minimize the entanglement and disorganization of the fibers when the trays are slid in and out of the cabinet.

The gaps between side members also allows for optical fibers to be introduced into the tray from the front of the cabinet without having to access the rear of the cabinet to feed optical fibers into the trays through openings in the back of the cabinet. It will be understood by those skilled in the art that the optical fibers may be part of a cable or cables that each may contain a plurality of individual optical fibers. These cables are typically routed along the outside of the cabinet and the fibers contained therein are separated from the cable and fed into the desired tray. However, it will be understood that the optical fibers can be provided to the tray in any suitable manner, such as directly from a cable or cables, or from other trays within the cabinet.

The connection of optical fibers within a tray in accordance with the present invention is performed by service personnel by first sliding a tray out of the cabinet such that the tray is in the access position. The fibers to be connected are introduced into the tray in which the connection will be made from the same side or from opposite sides of the tray, as required by the location of the fibers to be interconnected. The connection between the fibers is preferably made by mating the connectors on the ends of each fiber to each other via the connection ports on the bulkhead of the tray. Excess lengths of fiber extending from the connectors may be stored in the side and/or rear of the tray and may be retained within the tray by the tabs extending from the rear lip 30 of the tray and/or the routing brackets 36 on the tray. When the storage or connection of the fibers in the tray is complete, the tray is slid back into the cabinet. As the tray is being slid into the cabinet, the fibers travel within the gaps between the side members on one side or both sides of the cabinet. This is best seen in FIGS. 3 and 4, in which fibers travel within the gap the entire length of the side member. This minimizes the tangling of fibers and enhances the organization of the many fibers in the cabinet. On the outside of the cabinet, the fibers may be retained within routing channels 42 and 44 for additional organization.

Thus, the introduction of fibers into the tray and the interconnection and storage of fibers in the tray can be performed by service personnel entirely from the front of the cabinet without requiring access to the rear of the cabinet, which is disadvantageous as described above.

It should be understood by those skilled in the art that the storage and interconnection of fibers is not limited solely to the examples described herein and shown in the figures. To the contrary, the disclosed invention permits optical fibers to be stored and interconnected in any other suitable orientation within the tray. Furthermore, the present invention is not limited solely to the interconnection of optical fibers, but can also be used relating to the interconnection of other types of electrical and/or optical conductors, which shall generically be called "cables."

Although a preferred embodiment of the present invention has been described above by way of example, it will be understood by those skilled in the art that modifications may be made to the disclosed embodiments that are within the scope of the invention as defined by the appended claims.

What is claimed is:

1. An apparatus for storing and interconnecting electrical or optical cables, comprising:
   a cabinet including a plurality of left side members and corresponding right side members, wherein a gap is defined between adjacent left side members and wherein a gap is defined between adjacent right side members;

a plurality of trays for storing and interconnecting cables therein, each tray being slidably situated in said cabinet between a respective left side member and a respective right side member such that each tray can be slid toward the rear of the cabinet into a storage position generally inside the cabinet and can be slid out of the front of the cabinet into an access position;

wherein said cables that are introduced into said trays travel in said gaps when said trays are slid in and out of the cabinet.

2. The apparatus of claim 1 wherein said cables are optical fibers.

3. The apparatus of claim 1 wherein said cables are electrical wires.

4. The apparatus of claim 1 wherein said left side members and said right side members are generally parallel.

5. The apparatus of claim 1 wherein said left side members and said right side members extend generally horizontally.

6. The apparatus of claim 1 wherein the gap between each left side member extends substantially the entire length of each left side member.

7. The apparatus of claim 1 wherein the gap between each right side member extends substantially the entire length of each right side member.

8. The apparatus of claim 1 wherein said cabinet further comprises a slot extending toward the interior of the cabinet from each left and right side member, and wherein each tray has a substantially flat base that is slidably situated within slots on respective left and right side members.

9. The apparatus of claim 8 wherein each said slot is defined by a u-shaped member with its open end extending toward the interior of the cabinet from each left and right side member.

10. The apparatus of claim 1 wherein each tray has a bulkhead with connection ports therein, and wherein the interconnection of cables occurs via the connection ports on said bulkhead.

11. The apparatus of claim 10 wherein said bulkhead on said tray is oriented generally perpendicular to the front of the tray and extends from the front of the tray toward the rear of the tray.

12. The apparatus of claim 1 wherein said cabinet further comprises a bottom plate extending between each left side member and each corresponding right side member.

13. The apparatus of claim 1 further comprising a routing channel connected to the exterior of said cabinet.

14. The apparatus of claim 1 wherein each tray includes a cable storage area in the rear of the tray.

15. The apparatus of claim 1 wherein said cables can extend from the tray at any position along the left side and the right side of the tray.

16. A method for storing and interconnecting optical fibers in a cabinet having a plurality of left side members and corresponding right side members, wherein a gap is defined between adjacent left side members and wherein a gap is defined between adjacent right side members, the cabinet having a plurality of trays for storing and interconnecting optical fibers therein, each tray being slidably situated in said cabinet between a respective left side member and a respective right side member such that each tray can be slid toward the rear of the cabinet into a storage position generally inside the cabinet and slid toward the front of the cabinet into an access position generally outside said cabinet, said method comprising the steps of:

sliding a tray from the front of the cabinet outwardly into the access position;

introducing two optical fibers from outside the cabinet into the tray from at least one side of the tray;

interconnecting said fibers on the tray;

sliding the tray toward the rear of the cabinet into the storage position, such that the optical fibers introduced into the tray travel in said gaps when the tray is slid into the cabinet.

17. The method of claim 16 wherein each said step can be performed without accessing the rear of the cabinet.

\* \* \* \* \*